I. F. LINDBERG.
DRILL CHUCK.
APPLICATION FILED MAR. 30, 1914.
Reissued May 12, 1914.
13,724.
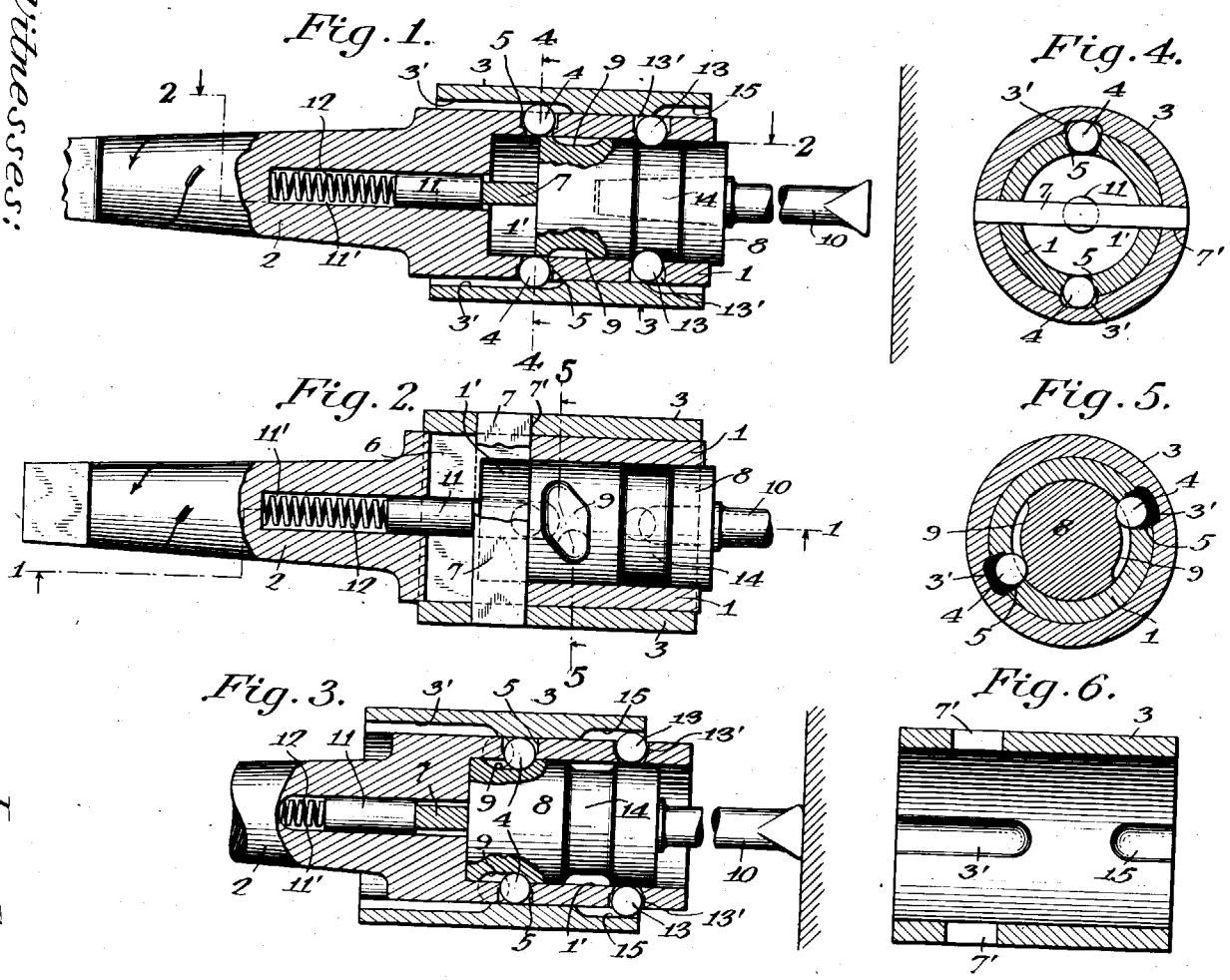
Witnesses:
W. H. Lieber
Rob. E. Stoll.
Inventor:
Ivar F. Lindberg
by G. F. DeWein
Atty.

UNITED STATES PATENT OFFICE.

IVAR F. LINDBERG, OF MILWAUKEE, WISCONSIN.

DRILL-CHUCK.

13,724. Specification of Reissued Letters Patent. Reissued May 12, 1914.

Original No. 1,054,126, dated February 25, 1913, Serial No. 698,430. Application for reissue filed March 30, 1914. Serial No. 828,921.

*To all whom it may concern:*

Be it known that I, IVAR F. LINDBERG, a citizen of the United States, and resident of Milwaukee, in the county of Milwaukee and State of Wisconsin, have invented certain new and useful Improvements in Drill-Chucks; and I do hereby declare that the following is a full, clear, and exact description thereof.

My invention refers to drill-presses, its object being to provide a simple, economical and effective safety tool-chuck, the construction and arrangement being such that the continuously driven tool is automatically clutched incidental to the same being opposed by resistance due to its engagement with the work and automatically unclutched incidental to retraction of the tool from its work due to end-thrust upon the point of said tool being relieved, these functions being accomplished through a spring-controlled sleeve which actuates one or more clutching tumblers that are adapted to engage or disengage the tool holder whereby the latter is connected or disconnected to the ordinary type of rotary tool head. Thus it is apparent that when the tool is withdrawn from its work by the operator for inspection or readjustment of the work there is no liability of the revolving tool to catch the operator or the garments thereof and cause serious personal injury. Heretofore the driven tool has been the common cause of accidents to drill-press operators, protecting shields or like safety appliances being inadequate for this class of machine owing to the fact that the cutting end of the drill or boring tool must necessarily be exposed when in action and hence it is only through the constant attention and care of the operator that accident is avoided. It follows that in providing a chuck having the above mentioned automatic feature that the point of the tool is rendered harmless except when in action, at which time said point is in cutting engagement with the work.

With the above object in view the invention consists in certain peculiarities of construction and combination of mechanical elements as hereinafter described with reference to the accompanying illustrations and subsequently claimed.

In the drawings Figure 1 represents a longitudinal sectional elevation of a tool-chuck embodying the features of my invention, the tool holder being in the position assumed when retracted from its work or unclutched from the tool-head; Fig. 2, a similar sectional view looking at a right angle from that in Fig. 1, the section being indicated by line 2—2 of said figure; Fig. 3, a similar sectional view of the tool-chuck with the tool-head in its clutched position; Fig. 4, a cross-section, the section being indicated by line 4—4 of Fig. 1; Fig. 5, a cross-section, the section being indicated by line 5—5 of Fig. 2; and Fig. 6, a longitudinal cross-section of a spring-controlled clutch-actuating sleeve.

Referring by character to the drawings, 1 represents a chuck-head that is hollowed out to form a tool-socket 1′, the said head being provided with a tapered shank 2 that is adapted to be secured in the usual manner to the spindle of a drill-press. Slidably mounted upon the exterior face of the chuck-head is a sleeve 3, the sleeve is provided with a pair of longitudinally arranged cam-grooves 3′ that are adapted to engage a corresponding pair of tumblers 4 of the ball-type. Each tumbler is nested within an aperture 5 that extends through the wall of the chuck-head in communication with its interior tool socket, the said apertures being lipped to form inner diameters of less diameter than the ball tumblers whereby the latter are caged in conjunction with the sleeve cam-grooves. The chuck-head is also provided with a transversely disposed key-way 6, which key-way intersects the base of the tool socket therein and slidably fitted into said key-way is a key 7 the ends of the latter being extended beyond the head for permanent engagement with key-apertures 7′ that extend through the sleeve. The key-way is of greater length than the key to permit limited longitudinal movement of the sleeve upon the chuck-head, which movement is had to cause depression of the tumblers or release of the same for automatic clutch control of a tool to be more fully described hereinafter.

The tool socket 1′ is arranged to receive a tool-holder 8, which tool-holder is provided with oppositely disposed tumbler-receiving recesses 9 in its face whereby said holder is locked or clutched relatively to the head incidental to pressure being applied to the point of a tool 10 that is seated in said holder in the ordinary manner. The rear face of the tool-holder 8 normally engages the sleeve-key 7 and this key together with the sleeve is normally forced forward upon the chuck-head by a plug 11 one end of which engages the key, the plug being reciprocatively mounted within a centrally bored aperture 11′ that extends into the chuck shank 2 and communicates with the tool socket. Interposed between the base of the socket 11′ and inner end of the plunger is a coiled spring 12, which coiled spring serves to force the plunger together with the key and sleeve forwardly upon the head in opposition to end thrust exerted upon the tool holder.

As best shown in Figs. 1 and 2 when the chuck is receded to withdraw the tool from the work the spring-controlled plunger causes the sleeve to be forced forward together with the tool holder whereby the tumblers 4 are deflected from the tumbler recesses within said tool holder, the cam grooves 3′ permitting said tumblers to rise above the plane of the head. Incidental with this disengagement of the tumblers with the tool-holder it is apparent that said tool holder will become unclutched from the head and any rotary movement imparted thereto will simply be through frictional contact. Hence said tool will either idly rotate or be stopped by contact therewith, whereby the operator can freely manipulate the work without danger of being mutilated by a positively driven tool.

As shown in Fig. 3 upon a forward movement of the chuck-head for causing engagement of the tool with the work end thrust upon said tool and its holder will cause the latter to recede within the socket to the position shown in said view in opposition to the spring pressed key and sleeve. Hence the sleeve will recede together with the key whereby the longitudinal cam-grooves within the sleeve will cause the tumblers to be deflected or depressed through their retaining apertures whereby their lower faces will enter the receiving recesses 9 and incidental to their entrance thereto, the chuck being revolved in the direction indicated by the arrow will cause the ball to pick up and rotate the tool-holder in the same direction whereby said tool is driven.

Attention is called to the fact, as best shown in Fig. 2, that the tumbler receiving recesses in the face of the holder are preferably provided with oblique edges which are engaged by the tumblers and owing to said engagement the tendency of the tool holder is to draw inward, tightly against its seat, the said tumbler and recess engagement being upon the inclined plane type. When the tool holder is in its unclutched position as shown in Fig. 1 it is apparent that the same might be liable to withdraw from its socket and to prevent this withdrawal I provide a pair of auxiliary tumbler balls 13 which are seated in tumbler apertures 13′ that extend through the wall of the chuck-head and are every way similar to the tumbler mechanism previously described. These tumblers are adapted to be depressed into an annular groove 14 that is formed in the circular face of the tool holder, the depressing movement being effected by cam-grooves 15 which are formed in the interior wall of the sleeve and hence when said tool holder is forced outwardly to its limit these ball tumblers prevent the same from being stripped from the socket. Should it be desired however to remove the tool holder, it can be effected by manually sliding the sleeve backward to a certain degree whereby the balls 13 can be forced upwardly into the grooves 15 incidental to withdrawal of the tool holder. Thus the said balls are automatically actuated to lock the holder against withdrawal from its socket and when said holder is in clutching engagement with the head the said balls are forced upwardly into the grooves 15 and will have no effect upon the operating mechanism.

From the foregoing description it is apparent that the tool and its holder are automatically clutched in connection with the head when said tool is in working position and automatically disengaged from the power-driven head the instant the cutting point of the tool is relieved from end thrust.

I claim:

1. A chuck comprising a socketed tool head, a tool holder seated therein provided with a tumbler recess, a tumbler carried by the tool head engageable with the tool holder recess, and a spring actuated sleeve mounted upon the head for controlling the movement of said tumbler, and means for communicating movement of said tool holder to said sleeve, whereby the tool holder is clutched incidental to end thrust being applied to said tool and unclutched incidental to release of said end thrust.

2. A tool chuck comprising a head provided with a tool holder socket, a tumbler aperture that communicates with the socket, and a transversely arranged keyway intersecting said socket, a shank extending rearwardly from the head, the shank being provided with a plunger aperture in communication with the aforesaid socket, a tool holder fitted into the tool socket having a tumbler recess in its face, a tumbler nested within the tumbler aperture of the head adapted to engage the tool holder recess, a cam-grooved sleeve slidably mounted upon the chuck head, a key carried by the sleeve extending through the keyway, and a spring controlled plunger fitted into the aperture of the aforesaid tool head shank engageable with the key.

3. A tool chuck comprising a socketed tool head, a tool holder seated therein provided with tumbler recesses and an annular groove, tumblers carried by the tool head engageable with the tool holder recesses, other tumblers carried by the head engageable with the annular groove of the tool holder, and a spring actuated sleeve mounted upon the head for controlling the movement of the sets of tumblers.

In testimony that I claim the foregoing I have hereunto set my hand at Milwaukee in the county of Milwaukee and State of Wisconsin, in the presence of two witnesses.

IVAR F. LINDBERG.

Witnesses:

G. F. De Wein,

W. H. Lieber.